United States Patent [19]

Corte

[11] Patent Number: 5,421,527

[45] Date of Patent: Jun. 6, 1995

[54] APPARATUS AND METHOD OF SEPARATING ASBESTOS CONTAMINANTS FROM SOIL

[75] Inventor: Lawrence J. Corte, Lakewood, Colo.

[73] Assignee: K N Energy, Inc., Lakewood, Colo.

[21] Appl. No.: 132,844

[22] Filed: Oct. 7, 1993

[51] Int. Cl.$^6$ .............................................. B02C 23/18
[52] U.S. Cl. ........................................ 241/20; 241/24; 241/29; 241/79.1
[58] Field of Search ...................... 241/20, 21, 24, 29, 241/79.1

[56] References Cited

U.S. PATENT DOCUMENTS

| | | | |
|---|---|---|---|
| 4,226,672 | 10/1980 | Absolon et al. | 162/3 |
| 4,699,721 | 10/1987 | Meenan et al. | 210/771 |
| 4,815,668 | 3/1989 | Frei | 241/23 |
| 4,820,315 | 4/1989 | DeMarco | 55/1 |
| 4,841,998 | 6/1989 | Bruya | 134/10 |
| 5,055,196 | 10/1991 | Darian et al. | 210/638 |
| 5,115,986 | 5/1992 | Bateson et al. | 241/20 |

*Primary Examiner*—John Husar
*Attorney, Agent, or Firm*—Fields, Lewis, Rost & Smith

[57] ABSTRACT

In accordance with this invention, a method and apparatus for removing contaminants from soil is provided. The invention comprises a classifier to separate oversized particles within the soil, a solid and liquid mixer to mix the soil and an added liquid, an agitator to fully mix the soil and liquid into a substantially homogeneous mixture, a separator wherein the soil and liquid are separated such that the contaminants float to the surface of the liquid, and a dryer wherein remaining excess liquid is removed from the substantially decontaminated soil. A material bin receives the oversized classified particles and a crusher/roller is provided to reduce the oversized material and return it to the classifier. The added liquid may include various chemicals to enhance the separability of the soil and contaminates. The solid and liquid mixer, agitator and separator may comprise of a number of sequential containers whereby separation is accomplished in a number of steps. For example, after a first separation of soil from liquid and contaminates occurs, new liquid may be introduced to further cause additional separation. A filtration device is operatively connected to the separated liquid whereby such liquid is filtered so as to be made reusable within the decontamination process.

29 Claims, 2 Drawing Sheets

Fig_1

APPARATUS AND METHOD OF SEPARATING ASBESTOS CONTAMINANTS FROM SOIL

TECHNICAL FIELD

This invention relates to an apparatus and method for decontaminating soil, more particularly, it relates to an apparatus and method of removing asbestos matter from soil. This method and apparatus are capable of returning soil to its substantially uncontaminated state.

BACKGROUND ART

U.S. Pat. No. 4,841,998 to Bruya is directed to a method of decontaminating soil by removing organic hazardous waste with an aqueous ammonia solution. In this process, contaminated soil is introduced to a screen whereby undersized particles are passed to a hopper. Oversized particles are moved to a crusher and then reintroduced to the screen. Once passing to the hopper, the soil is next placed in an agitator whereby an aqueous ammonia solution is introduced. The chemical reaction between the ammonia solution and the contaminants causes the contaminates to adhere to the ammonia. The resulting solution-contaminant mix and soil are then placed in a settling tank. Separation is achieved in the settling tank wherein the solution-contaminant mix is removed from the heavier soil. Further separation of fine soil particles from contamination is achieved in a centrifuge. Separation in this invention is therefore achieved through chemical reaction and not through differentials in specific gravity. This process is intended for removing organic hazardous waste and does not disclose any teaching of removing asbestos or other solid contaminants.

U.S. Pat. No. 4,815,668 to Frei discloses a process for recovering fibrous and/or granulated material from household and industrial waste. This is accomplished by preliminary comminution, magnetic separation, classification, drying and fractionation, wherein the light fraction resulting from the classification carried out after the magnetic separation is subjected to secondary comminution by cutting. The heavy fraction is subject to predominately granulating secondary comminution. Both comminution products are recombined and then fractionated into fibrous and granulated matter. There is no suggestion that this process can accommodate medium such as soil nor can such process result in separation of material such as asbestos.

U.S. Pat. No. 4,699,721 to Meenan et al. discloses a process and apparatus for removing organic contaminates from fluidizable solid material. Such contaminates are removed by boiling and then capturing the separated condensate. Since asbestos and some other solid contaminates are not readily vaporizable, this reference does not suggest treatment of such contaminates.

U.S. Pat. No. 4,820,315 to DeMarco is directed to removing particulate asbestos matter from a fluid such as air and from surfaces through use of a vacuum device. There is no teaching that indicates particulate matter separation is achieved through a process of mixing and settling.

U.S. Pat. No. 5,055,196 to Darian et al. discloses a method of decontaminating material such as soil or sludge whereby inorganic or organic contaminants are removed. The targeted contaminants are primarily ones such as PCBs and other organics. This is accomplished by contacting a water-wet solid mixture with a solvent containing a comminuting surfactant. The solvent used is a solvent for the contaminant and is sparingly soluble in water. The purpose of adding the comminuting surfactant to the solvent is to form a dispersed mixture of the solids, contaminants, and water whereby the contaminants are extractable into the solvent. The solvent-contaminant mix is separated from the soil and ultimately, the contaminant is removed from the solvent mix. Thus, separation is achieved through the natural affinity between the solvent and contaminates.

While each of the inventions described above fulfills its intended purpose, none of them are directed towards decontamination of soil, particularly from asbestos, in the manner as disclosed in this invention.

DISCLOSURE OF THE INVENTION

The present invention contemplates a method and apparatus for decontaminating soil by removal of hazardous material, such as asbestos or other contaminates. Excavated contaminated soil is placed in a classifier that sorts oversized material and removes it to a material bin that can include a crushing means to reduce the oversized material. The reduced material can then be reintroduced into the classifier for further processing. Passable soil is conveyed from the classifier to a mixing tank whereby the soil is mixed with a liquid. It is necessary that such liquid maintain a higher specific gravity than that of the contaminants so that after mixing has taken place, the differential in specific gravity between the contaminants and liquid causes the contaminants to rise to the surface portion of the tank. After adequate mixing has taken place, separation will occur such that substantially decontaminated soil rests near the bottom portion of the tank constituting a lower stratum of soil stream. Above the soil stream is liquid and yet further above lies separated contaminates. Separation may take place in the mixing tank or can be accomplished in a separate vessel.

Chemical additives, such as flocculating agents and chelating agents can be added to the liquid prior to introduction of soil to adjust the specific gravity of the liquid. Mixing of the soil, liquid and chemicals may be accomplished in a variety of ways to include mixing by paddles or forced air or water. The goal in mixing is to initially achieve a somewhat homogenous mixture of constituents resulting in contact between contaminate matter and liquid. Such contact enhances the separability efficiency because trapped contaminates not in contact with the liquid may not be separated.

Once the targeted contaminant has risen to the upper layers of the liquid, the contaminates are then removed to a catch vat or overflow vessel. The contaminated upper layers of liquid are then processed through filters whereby suspended contaminates are separated from the liquid. It is desirable to separate out the larger pieces of solid contaminates as much as possible prior to filtration to avoid clogging of the filters. Separation of the larger particles can be achieved through a variety of means to include skimming or decanting. The filtered liquid may then be reused within the process to further decontaminate additional soil. The filtered and skimmed contaminates are combined and placed into final collection vats or tanks for environmentally prudent treatment, disposal or recycling.

The lower stratum of the soil stream in the mixing tank containing primarily decontaminated soil, is removed by a variety of options. One variation is a bottom solids reclamation device which allows the soil to slurry out into a drying means by use of a bottom dumping door or a pumping system.

This invention also contemplates use of a series of sequential tanks wherein the lower stratum of the soil stream is introduced into a series of tanks containing liquids of varying specific gravities and chemical additives. This phased separation of contaminates can result in isolation of differing contaminates and allow for more complete decontamination.

Once the soil stream is decontaminated to the desired level, it is placed in a drying means where evaporation removes the desired level of remaining liquid. Upon proper liquid removal, the substantially decontaminated soil is replaced to the point of original excavation, is subjected to further decontamination treatment, or otherwise disposed of in compliance with applicable prudent environmental practice.

BEST MODE FOR CARRYING OUT THE INVENTION

Figure 1:
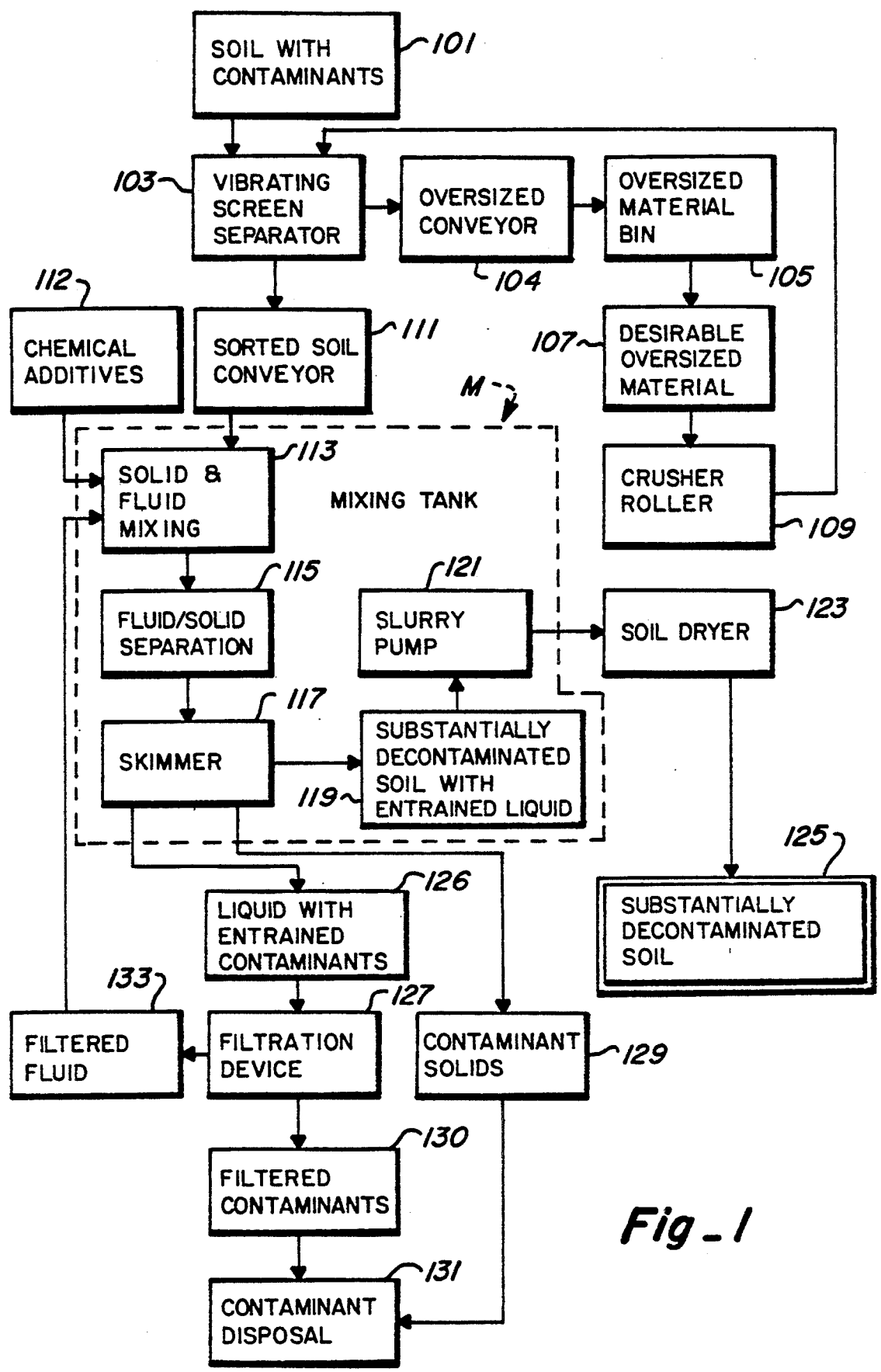
FIG. 1 is a process flow diagram illustrating the method for decontaminating soil.
Figure 2:
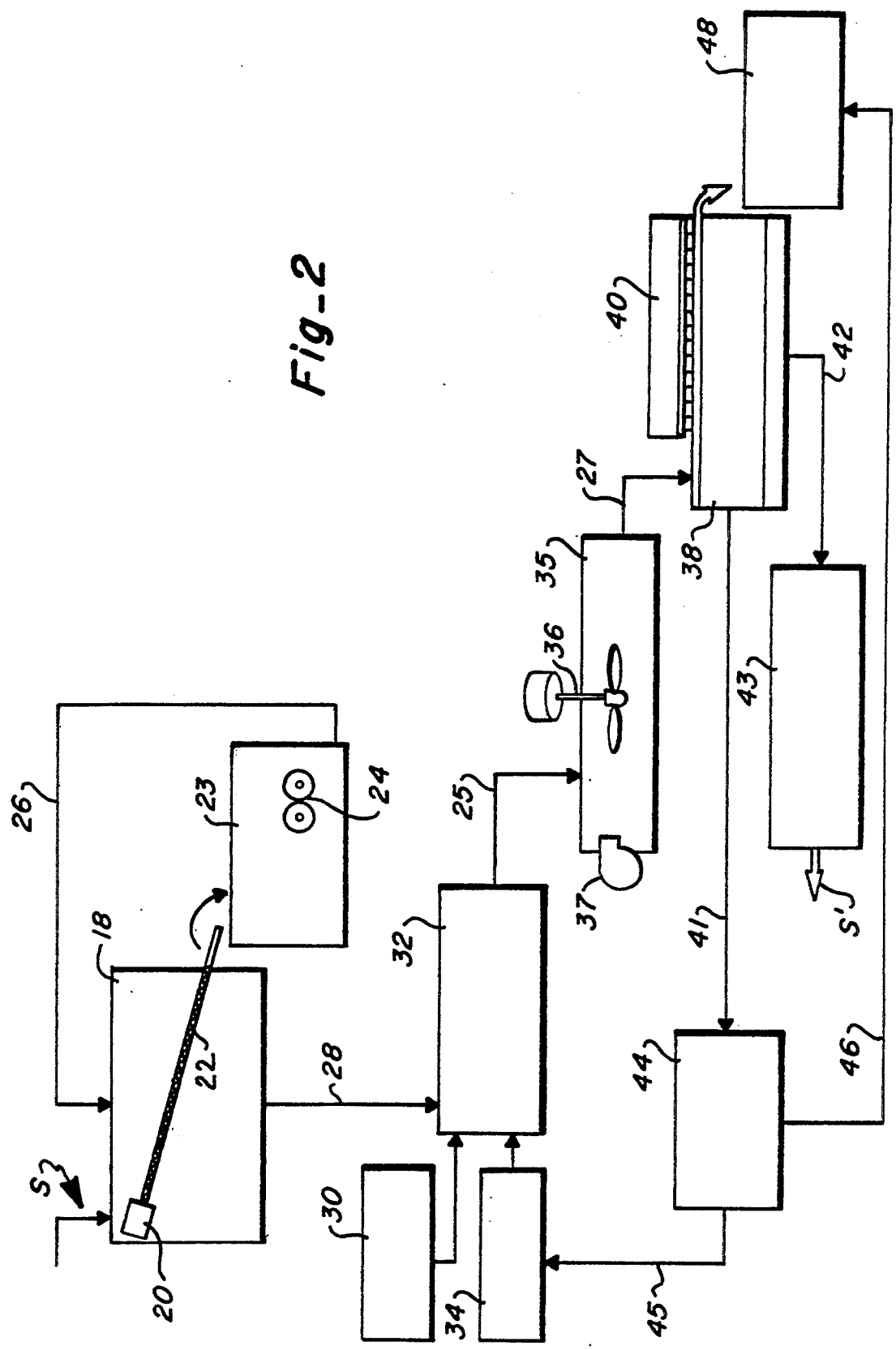
FIG. 2 shows the major components of an apparatus arranged in sequential order used for decontaminating soil.

In accordance with this invention, a method and apparatus are provided, as shown in FIGS. 1 and 2, for decontaminating soil. Referring first to FIG. 1, contaminated soil 101 is placed in a classifier, such as a vibrating screen separator 103, whereby sorted contaminated soil is transported by a conveyor 111 to a mixing tank M. The screen separator may utilize any number of differing sieve sizes depending upon the size of desired sorted material. Vibration can be provided by any common vibration means that results in aiding the soil to pass through the screen. This screen has adequate water or similar spray devices and/or operates in a vacuum controlled and sealed container, with filtration controls, which prevent contaminates from being liberated into the surrounding environment. Soil that cannot pass through the screen separator 103 is conveyed by oversized conveyor 104 to an oversized material bin 105. The conveyor 104 may also vibrate and can comprise a trough-like device wherein oversized material is gravity fed to the material bin 105. Oversized material may commonly comprise of rocks, refuse, and other extraneous matter. Undesirable oversized material, such as refuse, may be removed from the material bin 105. Desirable oversized material 107, such as large pieces of contaminates, is then conveyed to a crusher/roller 109 whereby oversized material is reduced in size. Reduced material is then recycled back to the screen separator 103 for further processing.

At the mixing tank M, the sorted soil is mixed with filtered liquid 133. It is necessary that the liquid has a higher specific gravity than that of the contaminates desired to be removed. With a differential in the specific gravity of the liquid and contaminates, a natural separation occurs whereby the less dense contaminates rise to the top of the mixing tank and the liquid remains below. The solid and liquid mixing phase 113 initially results in a somewhat homogenous mixture of liquid and solids. This mixture can be achieved by a variety of agitation means such as mechanical paddles, forced water or air jets. By creating a homogenous mixture, the contaminants are well dispersed within the liquid and such dispersal allows the specific gravity differentials to more effectively manifest a flotation effect on the targeted contaminants. Forced air or water jets can be facilitated by use of an ordinary pump with a rapid rate of displacement to create turbulence and subsequent mixing. Agitation may occur in the mixing tank or the solid and liquid may be transferred to a separate agitation tank.

Chemical additives 112, such as flocculating agents, chelating agents, or chemical compounds, may be added to the mixing tank to adjust the specific gravity of the liquid. Such additives are introduced in the solid and liquid mixing phase 113 of the process.

Once adequate mixing has occurred, the soil, liquid and chemical mixture is caused to settle in a liquid/solid separation phase 115 due to the specific gravity differential. Separation may be accomplished in a new tank whereby the mixture is transferred to such a tank or may occur in the same mixing or agitation tank. The amount of time necessary to achieve separation depends upon the type of contaminants present and the degree to which soil is desired to be decontaminated. Upon a determination of adequate separation, a skimmer 117 may be used to remove the separated layers of contaminates and liquid from the soil strata. The removed separated layers will comprise of two primary elements, namely contaminant solids 129 and liquid with entrained contaminants 126. The contaminant solids 129 are transported to a contaminant disposal 131. Liquid with entrained contaminants 126 is then subjected to a filtration device 127 whereby suspended contaminates are filtered from the liquid. It is desirable to remove as much solid contaminates as possible to avoid clogging of the filtration system. Filtered liquid 133 may then be reused in the process by conveying it back to solid and liquid mixing 113. Filtered contaminates 130 are combined with contaminated solids 129 in the contaminant disposal 131.

Any sequential combination of mixing, agitation, and settling tanks may be used to decontaminate soil to a desired decontaminated state. For example, it is contemplated that after initial mixing, agitation, and settling has occurred, the soil strata may then be introduced to a new liquid in which further mixing, agitation and settling occurs. This sequential treatment can result in removal of differing contaminants at each sequential combination by varying the specific gravity of the liquid in each step. Such sequential treatment may also result in a higher degree of removal of the initial targeted group of contaminants.

The substantially decontaminated soil with entrained liquid 119 is removed by means of a slurry pump 121 or other removal means, such as a bottom dumping device, to a soil dryer 123. The soil dryer 123 may consist of any common drying device whereby evaporation results in removal of excess moisture from the soil. Upon removal of the desired level of moisture, substantially decontaminated soil 125 is achieved that can be returned to the point of excavation, further subjected to additional treatment, or otherwise disposed of in compliance with prudent environmental practice.

Now referring to FIG. 2, contaminated soil S is placed in a housing 18 that contains a vibrator 20 and screen 22. Passable contaminated soil falls through the screen and is transported by conveying means 28 to a mixing tank 32. Oversized contaminated soil continues to be vibrated by vibrator 20 and is gravity fed into an oversized material bin 23. Undesirable oversized material may be extracted from bin 23 while remaining desirable material is crushed/rolled by crusher means 24 and then transported by conveyor 26 back to housing 18 for further processing.

In the mixing tank 32, contaminated soil is mixed with a first liquid from first liquid vessel 34. Chemicals 30 may be added to the soil S and first liquid. The chemicals may be added by dumping or by injection into the mixing tank. The mixture of chemicals, soil and liquid is then conveyed by means 25 to an agitator tank 35 wherein the motion of an agitator creates a substantially homogenous mixture. This agitation can be achieved by a mechanical mixer 36 or by forced air or other liquid from pump 37. The homogenous mixture is deposited by means 27 to a separator tank 38 wherein separation occurs between the soil and contaminates due to the flotation effect of the liquid upon the contaminates. Once adequate separation has occurred, a skimmer 40 removes the floating contaminates and conveys them to discard vessel 48. Liquid is removed from the separator tank and transferred by liquid conveying means 41 into a filtering system 44 whereby suspended contaminants are filtered from the liquid. Filtering may be achieved by passing the liquid through liquid filters housed in cartridges or other filtration devices. The filtered contaminates are conveyed by means 46 to discard vessel 48. Filtered liquid may then be conveyed from filtering system 44 by means 45 to first liquid vessel 34 for reuse in the decontamination process for subsequent mixing of additional contaminated soil.

Once the substantial portion of liquid and contaminates are removed from the separator tank 38, the remaining soil and liquid are transferred by conveying means 42 to a dryer 43. The dryer further removes undesired liquid by evaporation. After sufficient drying is completed, the substantially decontaminated soil S' can be returned to the point of excavation, be subjected to further treatment, or otherwise disposed of in an environmentally prudent manner.

It should be noted that this apparatus is not limited to single separation, agitation, and mixing tanks. As noted above in FIG. 1, any sequential combination of tanks can be used in the process to achieve decontamination. For example, it may be advantageous to employ a sequential series of mixing agitator, and separator tanks in which liquid of increasing or decreasing specific gravity is used at each new series. It should also be appreciated that, in order to conserve space or resources, mixing, agitation and settling can be achieved in a single tank.

This invention has been described in detail with reference to a particular embodiment thereof, but it will be understood that various other modifications can be effected within the spirit and scope of this invention.

What is claimed is:

1. A method of processing contaminated soil to remove particulate contaminants, said method comprising the steps of:
    passing the contaminated soil through a classifier having a desired mesh size to remove extraneous debris larger than the mesh size from the contaminated soil;
    mixing the contaminated soil from the classifier in a first liquid having a higher specific gravity than the contaminants in the contaminated soil to form a first mixture;
    causing the first mixture to settle such that differential in specific gravity of the first liquid and the contaminants causes a separation wherein substantially decontaminated soil settles to the bottom and the contaminants rise to the top;
    skimming the contaminants from the first liquid;
    removing substantially all the first liquid from the substantially decontaminated soil;
    mixing the substantially decontaminated soil in a second liquid having a different specific gravity than the first liquid forming a second mixture;
    causing the second mixture of the substantially decontaminated soil and second liquid to settle such that the differential in specific gravity of the second liquid and the substantially decontaminated soil causes further separation wherein further substantially decontaminated soil settles to the bottom and further contaminates rise to the top;
    skimming the contaminants from the second liquid; and
    removing substantially all the second liquid from the further substantially decontaminated soil.

2. A method, as claimed in claim 1, including the further step of:
    filtering the removed first liquid and second liquid to remove contaminants suspended therein.

3. A method, as claimed in claim 2, including the further step of:
    recycling the filtered first liquid and second liquid wherein the liquids are mixed with additional contaminated soil.

4. A method, as claimed in claim 3, including the further step of:
    combining the contaminants from skimming and filtration for disposal.

5. A method, as claimed in claim 1, including the further step of:
    removing the remaining second liquid in the decontaminated soil.

6. A method, as claimed in claim 5, wherein:
    the step of removing the remaining second liquid is accomplished by evaporating.

7. A method, as claimed in claim 1, including the further step of:
    adding chemicals during the mixing steps to enhance separation of contaminants from the mixtures.

8. A method, as claimed in claim 1, including the further step of:
    reducing the debris larger than the mesh size, and;
    introducing reduced debris through the classifier.

9. A method, as claimed in claim 1, including the further step of:
    catching the skimmed contaminants in a container.

10. A method of processing contaminated soil to remove asbestos, said method comprising the steps of:
    passing the contaminated soil through a classifier having a desired mesh size to remove extraneous debris larger than the mesh size from the contaminated soil;
    mixing the contaminated soil from the classifier in a first liquid having a higher specific gravity than the asbestos in the contaminated soil forming a first mixture;
    causing the first mixture to settle such that the differential in specific gravity of the first liquid and the asbestos causes a separation wherein substantially decontaminated soil settles to the bottom and the asbestos rises to the top;
    skimming the asbestos from the first liquid;
    removing substantially all the first liquid from the substantially decontaminated soil;

mixing the substantially decontaminated soil in a second liquid having a different specific gravity than the first liquid forming a second mixture;

causing the second mixture of the substantially decontaminated soil and second liquid to settle such that the differential in specific gravity of the second liquid and the substantially decontaminated soil causes further separation wherein further substantially decontaminated soil settles to the bottom and further asbestos rises to the top;

skimming the asbestos from the second liquid; and removing substantially all the second liquid from the further substantially decontaminated soil.

11. A method, as claimed in claim 10, including the further step of:

filtering the removed first liquid and second liquid to remove remaining asbestos suspended therein.

12. A method, as claimed in claim 11, including the further step of:

recycling the filtered first liquid and second liquid wherein the liquids are mixed with additional contaminated soil.

13. A method, as claimed in claim 12, including the further step of:

combining the contaminants from skimming and filtration for disposal.

14. A method, as claimed in claim 10, including the further step of:

removing remaining second liquid in the decontaminated soil.

15. A method, as claimed in claim 14, wherein:

said step of removing the remaining second liquid is accomplished by evaporating.

16. A method, as claimed in claim 10, including the further step of:

adding chemicals during the mixing steps to enhance separation of asbestos from the mixtures.

17. A method, as claimed in claim 10, including the further step of:

reducing the debris larger than the mesh size, and;

introducing the reduced debris through the classifier.

18. A method, as claimed in claim 10, including the further step of:

catching the skimmed asbestos in a container.

19. An apparatus for processing contaminated soil to remove asbestos, said apparatus comprising:

a classifier having a desired mesh size to remove extraneous debris larger than said mesh size from the contaminated soil;

means for passing the contaminated soil through said classifier;

a first mixing station for mixing the contaminated soil received from said classifier in a first liquid having a higher specific gravity than the asbestos in the contaminated soil to form a first mixture;

means for conveying the contaminated soil from said classifier to said first mixing station;

a first agitation station wherein the mixed contaminants and soil are agitated such that a substantially homogeneous mixture is achieved;

means for conveying the first mixture from said first mixing station to said first agitation station;

a first settling station for causing the first mixture to settle such that the differential in specific gravity of the first liquid and the asbestos causes a separation wherein substantially decontaminated soil settles to the bottom and the asbestos rises to the top;

means for conveying the first mixture from said first agitation station to said first settling station;

means for skimming the asbestos from the first liquid;

means for removing substantially all the first liquid from the substantially decontaminated soil;

a second mixing station for mixing the substantially decontaminated soil received from said first settling station and a second liquid having a different specific gravity that the first liquid to form a second mixture;

means for conveying the substantially decontaminated soil from said first settling station to second said mixing station;

a second agitation station wherein the mixed contaminates and substantially decontaminated soil are agitated such that a substantially homogenous mixture is achieved;

means for conveying the second mixture from said second mixing station to second agitation station;

a second settling station for causing the second mixture to settle such that the differential in specific gravity of the second liquid and the asbestos remaining in the substantially decontaminated soil causes a separation wherein further substantially decontaminated soil settles to the bottom and the remaining asbestos rises to the top;

means for conveying the second mixture from said second agitation station to said second settling station;

means for skimming the asbestos from the second liquid; and means for removing substantially all the second liquid from the further substantially decontaminated soil.

20. An apparatus, as claimed in claim 19, further including:

means for filtering the removed first liquid and second liquid to remove asbestos suspended in the first liquid and second liquid respectfully.

21. An apparatus, as claimed in claim 20, further including:

means for recycling the filtered first liquid and second liquid wherein the liquids are mixed with additional contaminated soil.

22. An apparatus, as claimed in claim 21, further including:

means for combining the asbestos from skimming and filtration for disposal.

23. An apparatus, as claimed in claim 19, further including:

means for removing remaining second liquid in the decontaminated soil.

24. An apparatus, as claimed in claim 23, further including:

means for removing the remaining second liquid by evaporation.

25. An apparatus, as claimed in claim 19, further including:

means for adding chemicals to the mixtures to enhance separation of asbestos from the mixtures.

26. An apparatus, as claimed in claim 19, further including:

means for reducing the debris larger than said mesh size, and;

means for introducing reduced debris through said classifier.

27. An apparatus, as claimed in claim 19, further including:

means for catching said skimmed asbestos in a container.

28. An apparatus, as claimed in claim 19, wherein:
said first mixing and agitation stations are within a single tank; and
said second mixing and agitation stations are within a single tank.

29. An apparatus as claimed in claim 19, wherein:
said first mixing, agitating and settling stations are within a single tank; and
said second mixing, agitating and settling stations are within a single tank.

* * * * *